United States Patent [19]

Lundvall et al.

[11] 3,766,937

[45] Oct. 23, 1973

[54] A DRIVE FOR THE TOWERS OF A SELF-PROPELLED SPRINKLER

[76] Inventors: Elmer E. Lundvall; Roy Lundvall, both of Greeley, Colo.

[22] Filed: Oct. 27, 1971

[21] Appl. No.: 192,975

[52] U.S. Cl. .................................. 137/344, 239/212
[51] Int. Cl. ......................... B05b 9/02, E01h 3/02
[58] Field of Search ........................... 239/213, 212; 137/344

[56] References Cited
UNITED STATES PATENTS

| | | | |
|---|---|---|---|
| 3,386,661 | 6/1968 | Olson et al. | 239/212 X |
| 2,800,364 | 7/1957 | Dick et al. | 239/212 X |
| 3,417,766 | 12/1968 | Purtell | 239/212 X |
| 3,590,853 | 7/1971 | Haynes | 239/212 X |
| 2,652,282 | 9/1953 | Willetts | 137/344 |
| 2,889,993 | 6/1959 | Willetts et al. | 239/213 X |
| 2,941,727 | 6/1960 | Zybach | 239/212 X |
| 3,394,729 | 7/1968 | Bower et al. | 239/212 X |
| 3,498,542 | 3/1970 | Hefner et al. | 239/212 |
| 3,598,142 | 8/1971 | Neier | 239/212 X |
| 3,606,161 | 9/1971 | Paul | 137/344 X |

*Primary Examiner*—Samuel Scott
*Attorney*—Frank C. Lowe

[57] ABSTRACT

The present invention concerns improvements in the mechanisms for driving the towers of a self-propelled sprinkler of the type which includes a length of pipe supported by an array of towers and with one end of the pipe connected to a water supply pivot about which the sprinkler moves. Ordinarily, the drive at the outermost tower is set to move that tower at a selected rate while the drives at the intermediate towers are controlled by the flexure of the pipe to compensatively speed up or slow down the movement of those towers to hold the pipe in a substantially straight alignment as it rotates about its pivot point.

15 Claims, 8 Drawing Figures

INVENTOR.
Elmer E. Lundvall
Roy Lundvall
ATTORNEYS

INVENTOR.
Elmer E. Lundvall
BY Roy Lundvall
BY Van Valkenburgh & Lowe
ATTORNEYS

INVENTOR.
Elmer E. Lundvall
Roy Lundvall
BY *Van Valkenburgh & Lowe*
ATTORNEYS

INVENTOR.
Elmer E. Lundvall
Roy Lundvall
BY Van Valkenburgh & Lowe
ATTORNEYS

A DRIVE FOR THE TOWERS OF A SELF-PROPELLED SPRINKLER

In the present invention, the drive at each tower is a self-contained, hydraulic system which is adapted to reciprocate the piston of a driver cylinder. This piston is connected to trojan bars to engage sprocket lugs on the wheels of the tower to intermittently move the tower. The hydraulic system includes a control valve which operates to drive a reciprocator valve which, in turn, operates the cylinder so that the pistons reciprocate constantly as long as the control valve is open, as when the tower is out of alignment with other towers. This control valve is opened by a cable which, in turn, extends to portions of the sprinkler pipe to be pulled to open the valve whenever the pipe is flexed as when the tower gets out of alignment. Pipe flexure is assured by a flexible coupling in the pipe alongside the tower connecting two pipe sections together with the coupling being held in place by a universal joint type connector between the pipe sections. To supplement the driving action of the trojan bars, a set of detents is provided to prevent a backward runaway movement of the tower and a lock bar is connected with the reciprocating piston to act in opposition therewith to prevent forward runaway movement of the tower.

The present invention relates to apparatus for sprinkler irrigation, and more particularly to a sprinkler system which consists of a length of pipe carried upon an array of spaced, mobile towers to swing about a water supply pivot at one end of the pipe. Such apparatus is commonly called a "self-propelled sprinkler", to allude to the fact that the mobile towers supporting the pipe are self-propelled, with the outer tower moving at a fixed rate about a circular path and with the rate of movement of the other towers being compensatively controlled by the flexure of the sprinkler pipe to hold the pipe and the towers in straight alignment between the fixed pivot and the moving outer tower.

A primary object of the present invention is to provide a novel and improved driving mechanism for the towers of a self-propelled sprinkler which is capable of moving the towers about their circular paths in an easily-controlled, reliable manner and with an absolute minimum of power consumption.

The self-propelled sprinklers are large units and many will have ten or more towers supporting reaches of a 6 or 8 inch pipe which can exceed 100 feet. Accordingly, when the pipe is full of water, a heavy load will be imposed on each tower and a large force or torque will be required at the drive wheels of each tower to move the system about its designated circular path. The driving apparatus must be especially rugged and powerful when the sprinkler is irrigating uneven ground where the towers must move uphill and downhill. During the development of self-propelled sprinkler systems, the power for driving the systems was first obtained from the water, under pressure, within the pipe line by using this water to extend the pistons of hydraulic cylinders. This system, though still being extensively used, is objectionable because the water is discharged upon the ground near the towers, without contributing to effective irrigation of the area. Also, sometimes undesirable bogs are formed with this waste water. In view of these problems, considerable effort has been directed toward developing driving systems which are operated by electrical power. However, such systems, using electric motors, have not proven to be satisfactory, primarily because mechanical gears are necessary to reduce the speed of the motors to drive the towers at a specified slow rate of speed. The electrical motors and mechanical gears are not suited for an operation involving continual, repeated starting and stopping such as occurs when a tower of the sprinkler moves about its circular course. Such continual starting and stopping of the heavily loaded towers has created mechanical and maintenance problems which, in some instances, has rendered the sprinkler uneconomical to operate.

The present invention was conceived and developed with the foregoing and other considerations in view, and this invention comprises, in essence, a drive for each tower of a self-propelled sprinkler which is essentially a closed circuit hydraulic system at the tower. A small electrical motor drives the pressure pump of this hydrualic system. The motor operates continuously, and when the tower is not moving, a valve directs the fluid through a bypass with a minimal consumption of power. To move the tower, the valve is shifted to direct the fluid to an actuator cylinder. Trojan bars connected with the piston of this cyclinder then engage sprocket lugs on the wheels of the tower, all as hereinafter described in detail.

It follows that another object of the invention is to provide a novel and improved driving mechanism for each tower of a self-propelled sprinkler which uses a small electric motor, not larger than a ½ to ¾ horsepower capacity, to effectively drive the heavy tower and pipe supported by it with the many starts and stops necessary in a sprinkling operation, and to do so in an easy, inexpensive manner.

Another object of the invention is to provide a novel and improved driving mechanism for each tower of a self-propelled sprinkler which is not overloaded and placed under a severe strain whenever the tower starts or stops, which may be arranged to drive both the forward and the rear wheels of the tower to minimize slipping of the tower wheels, and to drive the tower in either direction.

Another object of the invention is to provide a novel and improved driving apparatus for each tower of a self-propelled sprinkler which includes an improved and simplified arrangement of restraints to prevent a tower from getting out of control, as for example, when the ground surface is sloping.

Another object of the invention is to provide, in a self-propelled sprinkler, an improved arrangement for flexing the pipe at each intermediate tower to better actuate the controls associated with the driving mechanism at the tower whenever the tower lags and falls out of alignment with respect to its adjacent towers.

Other objects of the invention are to provide a novel and improved driving mechanism for the towers of a self-propelled sprinkling system which is simple, self-contained, compact, reliable, rugged and durable, which requires a minimum of maintenance, which can be easily maintained by the regular farm operators and which will seldom require special factory parts and components.

With the foregoing and other objects in view, all of which more fully hereinafter appear, our invention comprises certain constructions, combinations and arrangements of parts and elements as hereinafter described, defined in the appended claims and illustrated in the accompanying drawings, in which:

Figure 1:
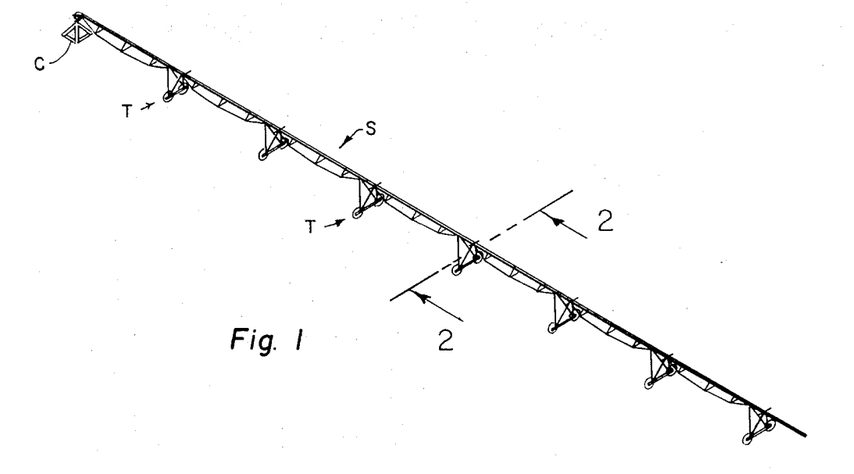
FIG. 1 is a small scale, somewhat diagrammatic, perspective view of a self-propelled sprinkler illustrating one end of the pipe secured to a pivot supply point and with the extended reach of the pipe being supported by a number of towers.

Referring more particularly to the drawing, the self-propelled sprinkler S, illustrated at FIG. 1, consists of an elongated pipe P which is connected to a center supply pivot C and is supported upon a plurality of towers T to move the pipe P in a circular path about the center pivot C. The supply pivot C provides water to the pipe under pressure in any suitable manner, not shown. Sprinkler heads, also not shown, are mounted upon the pipe to distribute the water supplied from the center pivot to the area which is traversed by the sprinkler S when it is rotated about the center pivot C. Although only seven towers are shown in the drawing, a larger number is usually used, for the length of the pipe may exceed one-fourth mile, to sprinkle at least a quarter section of land in one operation. The span of pipe between the towers is supported by a reinforcing trusswork R, and such is necessary because the span between the towers may be more than 100 feet.

Each tower is self-propelled so the towers combine to drive in circular paths about the center pivot. The driving movements of each tower are controlled by the flexure of the pipe in a compensating manner, that is, when one tower gets out of line as by lagging behind the others, the resulting bend in the pipe causes this tower to speed its driving movements until it catches up with the others. Ordinarily, the outer tower, the tower at the end of the pipe remote from the center pivot, is set for moving at a uniform, selected rate, while the other towers move, essentially in an intermittent manner, at rates which keep the pipe in a substantially straight line in its movement about the center pivot. This overall arrangement, as above described, is essentially conventional, and the present invention resides in providing an improved drive for each of the towers and also, in association with the drive, an improved and simplified pipe connection at each tower to assure reliable, easy flexing of the pipe, all as will be hereinafter described in detail.

Figure 2:
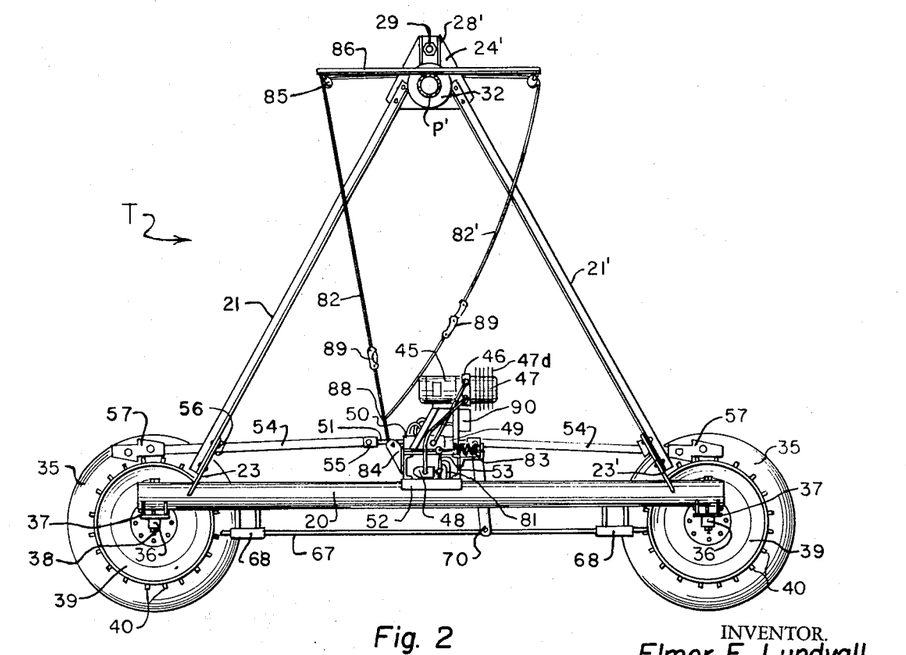
FIG. 2 is a transverse section of the sprinkler, as through the pipe, to show a side elevational view of a tower, the view being taken from the indicated line 2—2 at FIG. 1, but on an enlarged scale.
Figure 3:
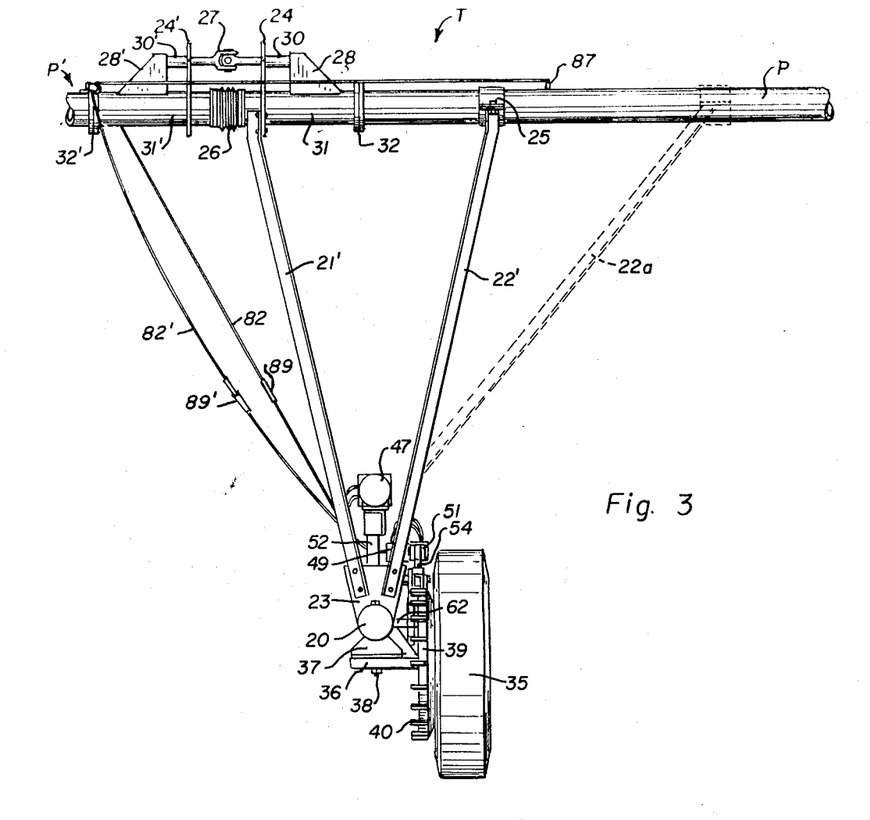
FIG. 3 is an end elevational view of the tower and a portion of pipe supported by it, as taken from the indicated arrow 3 at FIG. 2.
Figure 4:
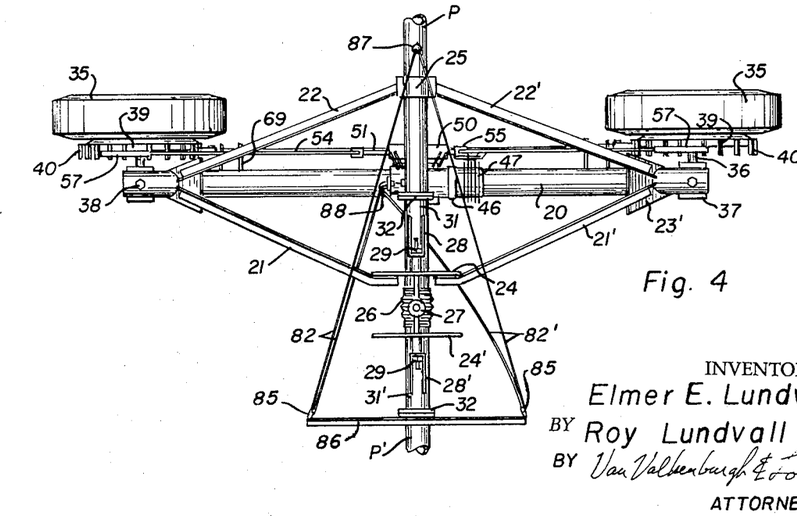
FIG. 4 is a plan view of the tower and pipe section shown at FIGS. 2 and 3.

As best illustrated in FIGS. 2, 3 and 4, each tower T is formed as a wheel-mounted, A-frame structure which includes a heavy, tubular base 20 extending transversely to and directly underneath the pipe P. A pair of struts 21 and 22 is connected to a gusset plate 23 upstanding from one end of the base tube 20. A similar opposing pair of struts 21' and 22' is connected to a gusset plate 23' at the other end of the base tube 20. These struts converge from the ends of the base tube 20 to connect with and to support the pipe P thereabove. The struts of each pair 21 and 22, and 21' and 22', diverge from their respective gusset plates 23 and 23' to connect with the pipe P at spaced-apart points. In this manner, the four struts, the reach of the base tube 20 between the struts and the reach of the pipe P between the struts combine to form the outline of a tetrahedron, an inherently rigid geometrical form. Additionally, a supplemental strut 22a may be connected to the base of the strut 22' and to the pipe P to enhance the rigidity of the system, as shown in broken lines at FIG. 3.

The upper converged end of the opposing struts 21 and 21' are connected to the base corners of a triangular flange 24 secured to the pipe P, while the upper converged end of the opposing struts 22 and 22' are connected to a collar 25 fitted to the pipe P. The gusset plates 23 and 23' are preferably welded to the base tube 20. Likewise, the flange 24 and collar 25 are preferably welded to the pipe section P, while the struts 21, 21'; 22 and 22' may be either bolted or welded in place.

An essential feature of the operation of a tower of a self-propelled sprinkler resides in flexure of the pipe whenever the tower gets out of alignment, for this flexure is used to actuate a control mechanism to speed up, or slow down, the movement of the tower. Rather than rely upon the elasticity of the pipe itself, a flexible coupling 26 is provided in the pipe at the side of the tower adjacent to flange 24. This flexible coupling is formed by conventional metal or fabric coupling material as a sleeve about the pipe. As such, the coupling does not reduce the effective cross-sectional area of the pipe and does not cause hydraulic friction losses therein. In conventional units, couplings such as ball and socket-type joints, are used to resist large tension and compression forces acting upon the irrigation pipe and these connectors do reduce the cross-sectional area of the pipe and cause substantial hydraulic losses. In the present invention, the pipe P is rigidified against such tension and compressive forces by a flexible connector 27 mounted above the coupling 26. This connector 27 is a universal joint secured between the triangular flange 24, which is near the end of the pipe reach over the tower and a similar triangular flange 24' which is near the adjoining end of a pipe section P', which forms a continuation of the pipe. Each shank of the universal joint extends through an opening in its respective flange 24, or 24', and through an aligned opening in an abutment bracket 28, or 28' respectively, where it is solidly anchored as by bolts 29. Spacer tubes 30, and 30', extend between the flange 24 and abutment 28, and flange 24' and abutment 28' respectively, to rigidify this mount of the universal joint. To facilitate the manufacture of these anchoring components, the flange 24 and its abutment bracket 28, and the flange 24' and its abutment bracket 28', are welded to a short pipe section 31, and 31', which joins with the pipes P and P', as with conventional flange connections 32, and 32', as best shown at FIG. 3.

Figures 5, 6:
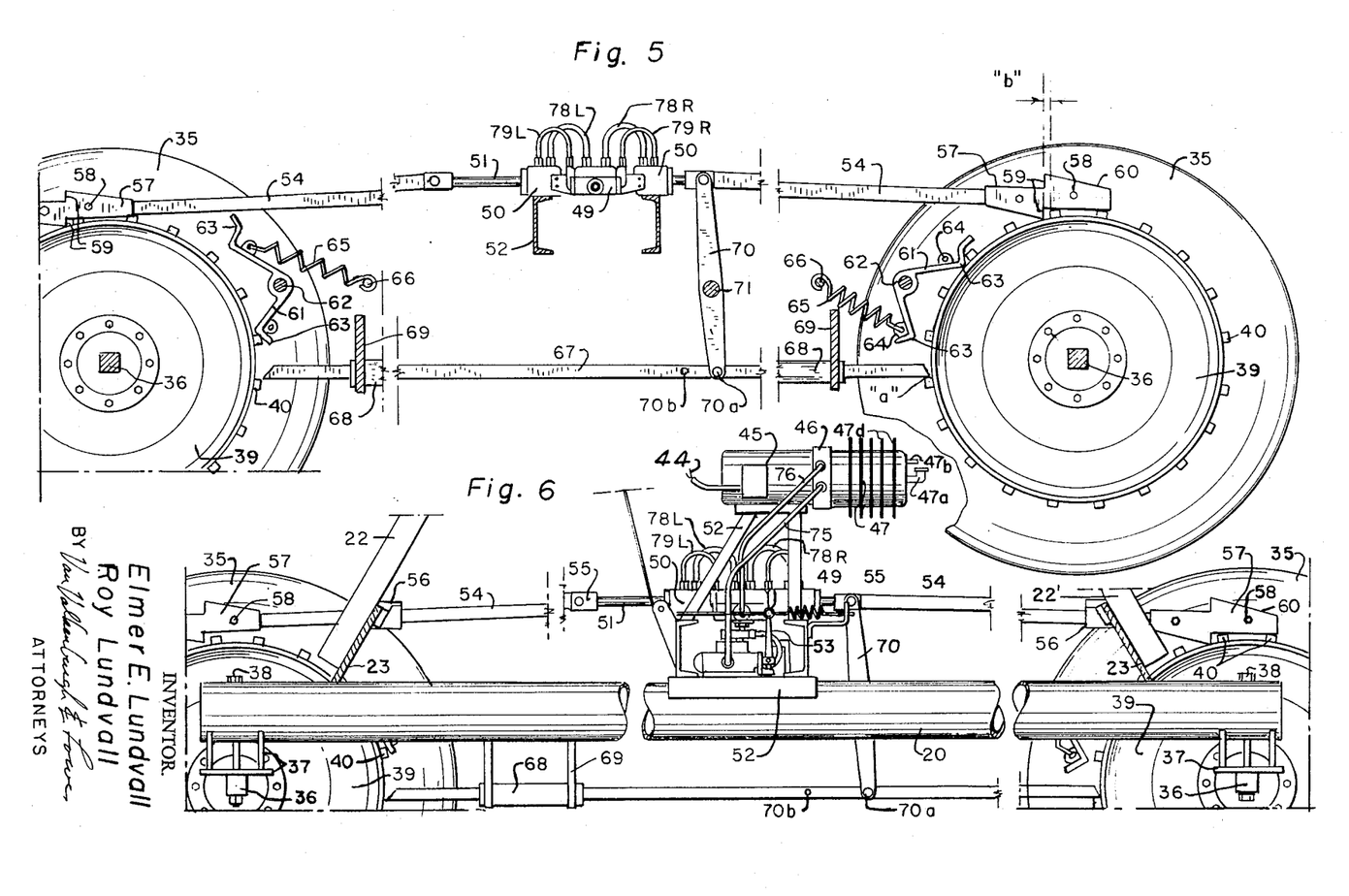
FIG. 5 is a fragmentary sectional elevational view, as taken from the indicated line 5—5 at FIG. 4, but on an enlarged scale and with portions of the view being broken away and condensed to conserve space.
FIG. 6 is a fragmentary elevational detail as taken from the indicated line 6—6 at FIG. 4, but on an enlarged scale and with portions of the view being broken away and condensed to conserve space.

Each tower is mounted upon a pair of wheels 35 and one wheel 35 is secured to each end of the base tube 20. The base of a spindle axle 36 is secured to the underside of a saddle 37 at each end of the base tube. Each axle outstands from one side of the base tube to carry a wheel 35 which is connected to the axle in a conventional manner. The connection of the axle to the saddle is with a heavy bolt 38 which extends through both the base tube 20, the saddle 37 and the spindle axle 36, as best illustrated at FIG. 6.

Each wheel is provided with an auxiliary flange 39 at the side adjacent to the base tube 20 and each flange has a rim turned towards the base tube which carries a circle of lugs 40 which function as sprocket teeth of a gear, and which function to drive the unit, as hereinafter explained. In the embodiment of the invention shown at FIGS. 1 to 6, the wheels are depicted as having pneumatic tires which are of any selected, conventional type suitable to bear the loads imposed upon them. It is to be noted that the wheel rims, the hubs therefor, the bearings to support the same upon the spindles 36 and the spindles themselves, are also essentially conventional components which may be obtained from several sources. The flange 39, a dished, wheel-like member having an outturned rim, is adapted to be bolted to the hub of the wheels in any suitable manner, preferably by using the available conventional circles of bolts. Also, the flange 39 may be the body of the wheel itself, with the tire rim connected to one side of it and the rim 39a outstanding from the other side of it. The wheels may also be of other types, for example, in the embodiment shown at FIG. 8, an iron-rim wheel 35a is used and the lugs 40a are affixed to the periphery of the wheel to serve the double function of being sprockets and also cleats to grip the ground as the wheels are rotated.

The flange 39, secured to each wheel 35, is turned inwardly to lie adjacent to the base tube 20 at a location convenient for placement of a driver mechanism in alignment with the lugs 40. The driving system for the apparatus is powered by electricity with leads 44 connecting with an electric motor 45. The power leads 44 may be provided in any conventional manner such as being extended along a pipe P to each tower. Accordingly, the driving system consists of an electric motor 45 which drives an hydraulic pump 46 having an oil reservoir 47 associated with it. Hydraulic lines, hereinafter described, connect with a control valve 48, a reciprocating valve 49 and a double acting cylinder 50 whose piston 51 extends from both ends of the cylinder. These components are arranged as a compact group upon a framework 52 formed of short channel members and bar members welded to the top, and at the center, of the base tube 20. The members are placed on this framework so that the control arm 53 of the valve 48 is directly above the tube 20, to align it with pull cords as hereinafter described. The piston 51 lies parallel to the axis of this tube 20 and the cylinder is at one side of the tube to extend directly over the wheel flange 39. The motor 45, pump 46 and reservoir 47 are conveniently positioned above the valve 48 and these components are of a standard manufacture, of a compact integrated construction, as in the manner illustrated. The reciprocating valve 49 and the cylinder 50 are also of a standard manufacture, and though illustrated as separate components connected by hose sections, they are preferably integrated units of a compact arrangement.

The operative interconnections between the driving piston 51 and the wheel lugs 40 consist of a pair of opposing trojan bars 54 with one end of each trojan bar being pivotally connected to a head 55 at the adjacent end of the piston 51. The other end of the trojan bar 54 extends to a position directly above the wheel flange 39 and rests upon, and engages the lugs 40. A hook 56 is attached to each gusset plate 23, and 23', to hold the respective trojan bars in place as they move back and forth responsive to movements of the piston 51. The reciprocal movement of the piston 51 and the trojan bars rotates the wheels 35 to drive the towers and to effect this rotation, an extended end of each trojan bar carries a double acting driver head 57. Each head is formed as a flat, tubular member slidably fitted over the trojan bar and is held in position by bolts 58. The head includes a pair of opposing, and oppositely directed, abutment hooks 59, one being at each side of the bar. A sloping back surface 60 is formed behind each abutment hook to permit the hook to slide over a lug 40 on each return stroke of the piston. With the two opposing, oppositely directed, abutment hooks 59 on each head, the tower may be driven in either direction. It is to be noted that both wheels are driven simultaneously in the same direction. With the hooks shifted as in the manner illustrated at FIG. 2, the reciprocating movement of the piston 51 will cause the abutment hooks 59 at the underside of the head 57 to engage with lugs 40 to drive the tower from the viewer's left to his right. A simple 180° rotation of the piston and trojan bars will cause the reciprocating piston and bars to move the tower in the opposite direction.

One advantage of a self-propelled sprinkler over other types of irrigating apparatus, resides in the fact that these sprinklers may irrigate areas on a hillside where there is a moderate grade and also, areas of small rolling hills and hummocks. When irrigating such sloping or rolling lands, however, provision must be made to prevent a tower from losing control and either rolling ahead or rolling backwards because of its weight. In the present construction, a means is provided to prevent both a backward roll and a forward roll. To prevent a backward roll, as when the trojan bars are retracting, a latching detent 61 is provided for each wheel 35, as best shown at FIG. 5. Each detent 61 is formed as a V-shaped member mounted upon a shaft 62 which outstands from the side of the base tube 20 to place the detent alongside the wheel lugs 40. An abutment 63 is formed at each end of the detent and the unit is spaced from the wheel at a position where the detent may rock to normally place one of these abutments against a lug 40, while the other abutment clears the circle of lugs. Thus, each abutment holds the lugs to prevent rotation of the wheel in a given direction and the detent is rocked to engage the selected abutment, which prevents rotation of the wheel in a direction opposite to the direction the trojan bars move the tower. Each detent is spring biased to yieldably hold its position. An ear 64 outstands from each leg of the V-shaped detent adjacent to the abutment thereof. A spring 65 connects with a selected one of the ears and is held in tension by an anchor 66 outstanding from the base tube 20. In the drawing, FIG. 5, the detent abutments which engage the lugs 40 are adapted to prevent the wheels from rolling backwards, i.e., from right to left, since the forward tower moves from left to right. Should it become desirable to reverse the movement of the tower, the spring 65 on each detent is shifted to the opposite ear 64 on the detent to pull the detent in the opposite direction, to permit the opposite abutment 63 to engage the lugs.

Under some circumstances, the tower must be held against a forward roll, in the direction of tower movement, as might occur when the sprinkler is moving down a slope. Neither the detents 61 nor the trojan bars can prevent the wheels from suddenly rolling in the direction of tower movment. To lock the wheels against such a forward roll, a shiftable lock bar 67 is mounted in support tubes 68 secured to support plates 69 outstanding from the side of the base tube near each wheel. The lock bar is positioned to engage the lugs 40 of the wheels and is of a selected length to permit it to shift back and forth and, alternatively, into and out of engagement with the lugs 40 of both wheels. The lock bar is actuated by a lever 70 pivotally mounted upon a shaft 71 outstanding from the base tube 20. One end of this lever is pivotally connected with the lock bar 67 as at 70a and the other end is pivotally connected to a piston head 55.

When the tower is stationary and at the commencement of a forward stroke of the piston and the trojan bars, the forward end of the lock bar 67 is engaging a lug 40 at the front wheel, indicated as at "a," FIG. 5, and this prevents an inadvertent forward rotation of the wheel. This locking bar 67 must be released before the wheel moves and it is released by a short movement of the piston 51 as the piston commences to extend on its forward stroke. This movement must occur, however, before the driver head hook 59 engages an adjacent lug 40 at the top of the wheel and a slack space, indicated as "b," FIG. 5, is necessary for this purpose. As the forward end of the lock bar is disengaged from the lug 40 at a, the rear end of this bar 67 moves rearwardly and between a pair of lugs of the rear wheel to prevent a runaway rotation of the wheels forwardly a distance greater than one lug space. Accordingly, the limit of free forward movement of a tower is one lug space for each complete stroke of the trojan bar and the length of the stroke of the piston 50 and the trojan bars is such that a sufficient slack space b is provided to permit the wheels and the tower to move one lug space at a time for each stroke of the piston. It is to be noted that the position of the bar 67 must be timed with respect to the piston movement by a careful location of the pivot 70a connecting the bar and lever 70. Also, when the movement of the tower is to be reversed as by rotating the trojan bars, the pivot 70a will be shifted to a point 70b to reverse the bar timing with respect to the piston movement.

The drive system heretofore mentioned includes a motor 45, pump 46, reservoir 47, control valve 48, reciprocating head 49 and cylinder 50. This hydraulic system, interconnecting these components, is preferably a closed, self-contained system as shown diagrammatically at FIG. 7. The intake side of the pump 46 is connected to the reservoir 47 by an intake line 74. The discharge side of the pump is connected to a pressure line 75 which extends to the intake of the control valve 48. This control valve is in a bypass line 76 which extends to the reservoir 47 at intake line 74. A pressure line 77 branches from the pressure line 75 and extends to the intake of the reciprocating valve 49. The reservoir 47 is a closed chamber having a fluid intake 47a which establishes a fluid level within it. A pressure-retaining check valve 47b permits air to enter this chamber above the fluid level whenever a surge drops the pressure, but prevents a loss of air therefrom. A pressure filter 47c, connecting with the discharge line 76, keeps the fluid free of foreign particles and fins 47d facilitate cooling the oil as it is circulated.

Figure 7:
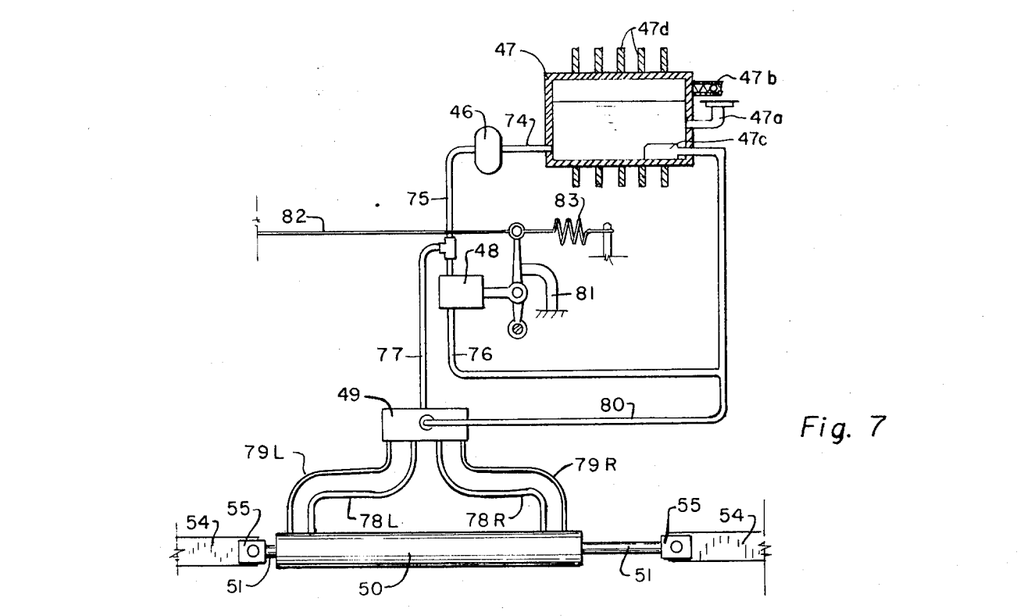
FIG. 7 is a diagram of the hydraulic drive system of the unit.

The valve 49 is a conventional type of a reciprocating shifting valve which automatically shifts the direction of movement of the piston of the double acting cylinder 50 at the end of each stroke thereof. The fluid flow from the pressure line 77 is alternatively directed from this reciprocating valve 49 and through lines output 78R or 78L which extend to the opposite ends of the cylinder 50. Additionally, control lines 79R and 79L extend from the reciprocating valve 49 to the opposite ends of the cylinder. These control lines 79R and 79L are each normally closed whenever the piston 51 is at an intermediate position in the cylinder, but each line will open, with one being pressurized and the other being relieved of pressure whenever the piston reaches an end of a stroke adjacent to one of the lines. These control lines, 79R and 79L, then shift seating spools within the receiprocating valve 49 to reverse the flow in lines 78R and 78L.

To complete the hydraulic system as above described, a discharge line 80 extends from the reciprocating valve 49 to connect with discharge line 76. This line 80 diverts the discharge flow from the cylinder as its piston is reciprocating, and returns the discharge flow to the reservoir.

Details of the mechanisms within the valve 49 and the cylinder 50 are not shown since the same are conventional and are well known, one type being manufactured by Von Ruden Mfg. Co. of Claremont, Minnesota. It is to be noted also, that the entire system or any portion thereof, consisting of the motor 45, the pump 46, the reservoir 47, the control valve 48, the reciprocating valve 49 and the cylinder 50, may be integrated into a compact unit so that the lines 74, 75, 76, 77, 78R, 78L, 79R and 79L are passageways within the framework or block, or blocks, forming the integrated unit. However, such a combination will in no way change the basic organization of the unit since the overall function will be the same, namely to reciprocate the piston 51 in cylinder 50 responsive to the shifting actions within the reciprocating valve whenever the control valve 48 is closed to force fluid under pressure through line 77 to the valve 49.

The control valve 48 includes the actuator arm 53 which is held against an abutment 81 when at its normal bypass position, where fluid flows through bypass line 76. The valve arm 53 is shifted by the pull of a cord 82 to close off bypass line 76 and divert the fluid flow to the pressure line 77. This cord 82 is held under tension by a spring 83 secured to the framework 52. The spring 83 pulls the valve arm 53 against the abutment 81 to hold the line 77 open. The cord 82 extends from the valve arm 53, about a pulley 84 on frame 52, and thence upwardly and to one side of the tower to a pulley 85 located at one outer end of a crossarm 86 located at the collar 32' of pipe P'. This end of the crossarm is at the rearward or trailing side of the tower when it is adapted to move as from left to right as in the drawings. Thence, the cord extends across the top of the tower in the general direction of the pipe P to connect at an anchor 87 at the top of the pipe P, as illustrated at FIGS. 2 and 3.

The cord 82 is bifrucated at a point 88, best shown at FIG. 2, with a branch 82' extending to a pulley 85' at the opposite end of the crossarm 86, the forward or leading end. Thence the cord 82' extends to the anchor point.

The flexible coupling 26 is positioned between the crossarm 24 on pipe P' and the anchor point 87 on the pipe P. Thus, a flexing of the pipe P at the coupling 26, will pull the cord 82 whenever a tower gets behind its normal alignment with respect to the adjacent towers. At the same time, the cord 82', at the opposite side of the tower, must be slack. This cord 82' is for operating the tower when the system is moving in the reverse direction to that indicated in the drawing, and accordingly, it must not be under tension to pull the valve 48 should it get ahead of its normal alignment with respect to the adjacent towers, to quickly and easily slack the cord 82', or cord 82, when desired to reverse the direction of tower movement. Thus, each cord will include a toggle 89, and 89' respectively, or any similar type clamp so that one may be opened to increase the effective length of its cord and slack the same, and the other closed to tighten its cord, as best shown at FIGS. 2 and 3.

The electrical system for this organization is not shown in the drawing since it is essentially conventional. Suitable junction boxes 90 are provided with the motor 45. This motor is preferably a one-half or three-fourths horsepower unit and is adapted to run continuously regardless of whether the tower is stopped or is moving. Accordingly, a minimum of electrical controls is required, and this simple arrangement is, in actual operation, quite efficient.

Figure 8:
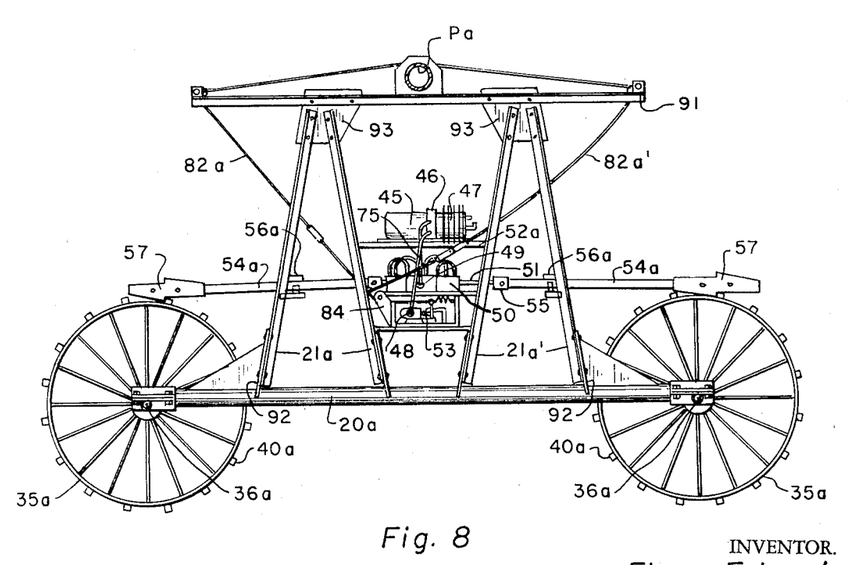
FIG. 8 is a side elevational view of a conventional type of tower which is modified to incorporate the present invention therein.

The organization shown at FIG. 8 exemplifies the manner in which the present invention may be incorporated into the tower of a conventional type of sprinkling apparatus with only slight and insignificant modifications. The conventional tower shown carries an irrigation pipe Pa which may be a continuous, flexible pipe or a segmented pipe with couplings alongside each tower such as the couplings 26 heretofore described. The tower itself is carried upon a base tube 20a with inner and outer struts 21a and inner and outer struts 21a' upstanding from the tube at the opposite ends thereof as shown, and other struts 22a and 22a', not shown, to support a crossbeam 91 which, in turn, carries the pipe Pa. These struts are rigidly held by gusset plates 92 connecting it to the base tube 20a and other gusset plates 93 connecting the crossbeam 90 with struts. A wheel 35a is mounted upon an axle 36a at each end of the base tube as heretofore described; however, in this conventional unit, iron rim wheels are commonly used. These wheels have lugs 40a about their peripheries and are to be used in the present invention.

A frame 52a, which may have two or three levels or shelves, is extended between the inner strut 21a and inner strut 21a' to support a drive mechanism. The drive mechanism will drive horizontally disposed trojan bars 54a as heretofore described, and this drive mechanism will include a motor 45, pump 46 and a reservoir 47 as a compact combination mounted upon one level of the frame 52a. The frame 52a will also support a reciprocating valve 49 and a double acting cylinder 50 associated with this valve. The cylinder is located so that its piston 51 is aligned with or is slightly above the top of the wheels 35a. Thus, one end of a trojan bar 54a may extend from each head 55 of the piston to a wheel 35a and a driver head 57 on each trojan bar will engage lugs 40a on the rim of one of the wheels 35a as illustrated. The trojan bars are held in position by restraining hooks 56a mounted upon these struts.

A valve 48 is provided in the pressure line 75 between the pump 46 and the reciprocating valve 49 and this valve is also mounted upon a frame member at a location suitable for the connection of the line 82a with the actuator arm 53 of the valve. The line 82a is connected to the pipe Pa in substantially the same manner as heretofore described, so as to be under tension whenever the pipe is flexed as when the tower lags behind its adjacent towers. Thus, the line 82a may be extended through a pulley 84 and thence to an end of the crossbeam 91 and thence extended from ths crossbeam through other pulleys to a connection on the pipe Pa which is at a point where a coupling, where the pipe bends, lies between the crossbeam and the connection. One advantage of the improved drive mechanism for the tower resides in the ease with which the movement of the tower may be reversed and this is also possible with a conventional tower such as shown at FIG. 8. The driver head 57 of each trojan bar has opposing abutment hooks 59 and the trojan bars merely need to be rotated 180 degrees to reverse the movement of the tower. To operate the valve 48 in this reverse movement, another line 82a' may be connected with the line 82 to extend to the other end of the crossbeam 91 and to connect with the pipe Pa, the same as heretofore described.

The unit shown at FIG. 8 may also include a latch detent, such as the detent 61 heretofore described, and an anchor bar, such as the anchor bar 66 heretofore described. Such components are optional and are used to restrain the movement of the tower over sloping ground and prevent a runaway of a tower. The manner of operation of this improved drive for a sprinkler tower, using either the tower as shown at FIGS. 1 – 6 or a conventional tower as shown at FIG. 8, is apparent from the foregoing description. It is merely necessary to set the outer tower to a selected constant velocity and this outer tower controls the movement of the other towers as the pipe swings about its center pivot point. The other towers, each with an independent, hydraulic drive, will move in starts and stops whenever theylag from alignment with their adjacent towers. Reversing the system is a simple matter as heretofore described, it merely being necessary to rotate the trojan bars, change the connections of the lever 70, the spring 65 on the detents 61 and to put tension from one line 82 to the line 82' with the toggles 89.

Maintenance of the apparatus is a comparatively simple matter. The small ½ or ¾ horsepower motor 45, the pump 46 and reservoir 47 form a combination which will operate trouble free for a long time and may be easily and quickly respaired or replaced whenever necessary. The control valve 48, the reciprocating valve 49 and the hydraulic cylinder 50 are simple components and about the only maintenance to be encountered will be an infrequent replacement of packing or O-rings on the cylinder and its piston 51.

We have now described our invention in considerable detail. However, it is obvious that others skilled in the art can build and devise alternate and equivalent

We claim:

1. An individual drive for each tower of a self-propelled sprinkler of the type which consists of a sprinkler pipe having one end connected to a water supply pivot and supported by a plurality of wheel mounted towers which are movable forwardly to rotate the pipe about its pivot and which include a response means at each tower responding to the flexing of the pipe at the tower whenever the tower lags behind the adjacent towers, said drive comprising in combination therewith:
   a. a sprocket means on a wheel of the tower;
   b. a cylinder with a double acting piston, having its axis alongside a tangent projection from the periphery of the sprocket means;
   c. a ratchet means on the piston engaging the wheel sprocket means, to rotate the wheel to drive the tower forwardly when the piston is moving in one direction and to slide over the sprocket means when the piston is moving in the opposite direction;
   d. an electrical power supply to each tower;
   e. an electrically driven pump at each tower connecting with the power supply at the tower and adapted to run continuously when the sprinkler is in operation;
   f. a self-contained fluid system associated with the pump and with the cylinder at each tower, including a pressure discharge line from the discharge side of the pump and an intake line to the intake side of the pump;
   g. a reciprocating valve connecting with the lines of the pump to receive flow from the pressure discharge line and to return flow to the intake line, and having output lines which extend to the respective ends of the cylinder, said reciprocating valve shifting the flow of the pressure discharge line from one output line to the other to effect reciprocation of the piston to drive the tower;
   h. a bypass line, shunting the pressure discharge line and the intake line to normally divert flow from said reciprocating valve when the tower is not being driven;
   i. a control valve means in the bypass line, actuated by the aforesaid response means, to normally remain open to permit flow through the bypass and not through the pressure line, but to close to prevent flow through the bypass and direct flow through the pressure line to the reciprocating valve whenever the response means responds to the aforesaid flexing of the pipe, whereby to effect reciprocation of the piston to move the tower forwardly, to alignment with other towers.

2. The drive defined in claim 1, wherein:
   the tower has two wheels in alignment with one constituting a front wheel and the other a rear wheel and with a sprocket means at each wheel;
   the aforesaid cylinder is mounted adjacent to, and with its axis being alongside and substantially parallel with the common tangent projection from the top points of the periphery of the sprocket means;
   wherein said ratchet means includes:
   a pair of trojan bars connected with the piston with each trojan bar extending from the piston of the cylinder to the sprocket means of a wheel; and
   an abutment on each trojan bar adapted to engage the sprocket means to rotate its wheel when the piston and trojan bars are moving in one direction and to slide over the sprocket means when the piston and trojan bars are moving in the opposite direction, and wherein
   the abutments of the two trojan bars are oriented in the same direction, whereby they may reciprocate in unison and engage both sprocket means to drive both wheels in the same direction.

3. In the organization defined in claim 2, including:
   a detent means adapted to engage a sprocket means to prevent a reverse rotation of the wheel thereof and a backward free roll of the tower.

4. In the organization defined in claim 2, wherein:
   said cylinder has a piston rod extending from each end thereof; and
   a trojan bar is connected to each end of the piston rod to extend to the adjacent sprocket means.

5. In the organization defined in claim 3, wherein:
   each trojan bar has a pair of oppositely-directed abutments at opposite sides of the bar, whereby the corresponding abutments of the bars will engage with their sprocket means for driving the tower in one direction, and the trojan bars may be rotated 180 degrees about their longitudinal axes to change the direction of abutment engagement and the direction of movement of the tower.

6. In the organization defined in claim 5, wherein:
   each trojan bar is pivotally connected to the piston, and wherein:
   both trojan bars and the piston are rotated simultaneously when rotating the same to reverse the driving direction of the trojan bars.

7. In the organization defined in claim 2, including:
   a lock bar slidably carried on the tower frame to extend between the lugs of each sprocket means with the length of the arm being such that it can engage a lug of only one sprocket means at a time; and
   a means to shift the arm from engagement with a lug of one sprocket means and into engagement with a lug of the other sprocket means, whereby to prevent a forward free roll of the tower a distance which is not greater than the spacing between the lugs of the sprocket means.

8. In the organization defined in claim 7, including:
   a lever connecting the lock bar with the piston, whereby when the piston commences its normal movement to engage the sprocket means, the movement disengages the lock bar from the sprocket means and wherein:
   the length of the piston is greater than the spacing between lugs of the sprocket means, whereby to provide a slack movement of the piston to permit the lock bar to be disengaged from a sprocket lug before the trojan bar engages the sprocket to move the wheel.

9. In the organization defined in claim 1, wherein the pipe includes:
   a flexible coupling adjacent to the tower where pressure occurs whenever the pipe is out of alignment;
   wherein said control valve means includes a lever which is pulled to operate the valve; and
   wherein the response means includes:

an arm outstanding from the pipe at one side of the flexible coupling;

a line connected to the pipe at the other side of the coupling and extended to the outer end of the arm;

said line extending from the outer end of the arm and thence to the control valve lever, whereby flexing of the pipe will pull the line and operate the valve lever.

10. In the organization defined in claim 9, wherein the two pipe sections interconnected by the flexible coupling are held in position, longitudinally, by a connector comprising:

a flange upstanding from each pipe section adjacent to the coupling;

a shaft extending between the flanges and secured thereto; and a universal joint in the shaft to permit horizontal and vertical freedom of movement.

11. In a drive for the tower of a self-propelled sprinkler of the type which consists of a sprinkler pipe having one end connected to a water supply pivot and supported by a plurality of wheel mounted towers which are movable to rotate the pipe about its pivot and which includes a response means at each tower responding to the flexing of the pipe at the tower whenever the tower lags behind the adjacent towers, the improvement comprising, in combination:

a. a pair of aligned, tower-supporting wheels constituting a front wheel and a rear wheel;

b. a sprocket means at each wheel;

c. a cylinder mounted on the tower between the wheel sprocket means, with its axis being alongside and substantially parallel with a common tangent projection from the top points of the sprocket means;

d. a double acting piston rod extending from each end of the cylinder; and e. a trojan bar connected to each end of the piston rod to extend to the adjacent sprocket means, each trojan bar carrying a pair of oppositely-directed, stepped ratchet abutments, at opposite sides of the bar, whereby the abutment at one side of each bar will engage with its sprocket means for driving the tower in one direction and the abutment at the other side of each bar will engage with the sprocket means for driving the tower in the opposite direction and the trojan bars may be rotated 180° about their longitudinal axis to change the direction of abutment engagement and the direction of movement of the tower.

12. In the organization defined in claim 11, wherein: each trojan bar is pivotally connected to the piston, and wherein:

both trojan bars and the piston are rotated simultaneously when rotating the same to reverse the driving direction of the trojan bars.

13. In a drive for the tower of a self propelled sprinkler, of the type which consists of a sprinkler pipe having one end connected to a water supply pivot and supported by a plurality of wheel-mounted towers which are movable to rotate the pipe about its pivot, wherein the drive includes:

an aligned front wheel and rear wheel, supporting the tower, a aprocket means on each wheel, a cylinder having its axis alongside and substantially parallel with a common tangent projection of the sprocket means, a pair of trojan bars connected with the piston with each trojan bar extending from the piston of the cylinder to the sprocket means of a wheel, a ratchet means on each trojan bar engaging the sprocket means to rotate its wheel when the piston and trojan bar are moving in one direction and to slide over the sprocket means when the piston and trojan bar are moving in the other direction, or whenever the wheel is rotating forwardly, and a detent means adapted to engage the lugs of a sprocket means to prevent a forward free roll of the wheel;

wherein the detent means includes:

a. a lock bar slidably carried on the tower frame to extend between the lugs of each sprocket means with the length of the arm being such that it can engage only one sprocket lug at a time; and b. a means to shift the arm from engagement with one sprocket lug and into the line of the lugs of the other sprocket means, whereby to prevent a forward free roll of the tower a distance which is not greater than the spacing between the lugs of the sprocket means.

14. In the organization defined in claim 13, including:

a lever connecting the lock bar with the piston, whereby when the piston commences its normal movement to engage the sprocket means, the movement disengages the lock bar from the sprocket means and wherein:

the length of the piston is greater than the spacing between lugs of the sprocket means, to provide a slack movement of the piston to permit the lock bar to be disengaged from a sprocket lug before the trojan bar engages the sprocket to move the wheel.

15. In a tower for a self-propelled sprinkler of the type which consists of a sprinkler pipe having one end connected to a water supply pivot and supported by a plurality of wheel mounted towers and wherein each tower carries an independent driving means to move it when the pipe rotates about its pivot and each driving means includes a lever means which is shifted to initiate movement of its tower responsive to the flexing of the pipe at the tower whenever the tower lags behind adjacent towers, the improvement comprising, in combination:

a. a flexible coupling in the pipe joining two pipe sections adjacent to each tower, and at a point where the pipe will flex whenever the tower lags behind the adjacent towers;

b. a connector connecting the two pipe sections at the flexible coupling including a flange means upstanding from each pipe section adjacent to the coupling, a shaft extending between the two flange means and secured thereto and a universal joint in the shaft to permit both horizontal and vertical movements between the pipe sections at the coupling; and c. a response means responsive only to horizontal movements between the aforesaid pipe sections, connecting to the two pipe sections at each side of the coupling and extending to the lever means, including:

an arm outstanding horizontally from one pipe at one side of the flexible coupling and a line connecting to the other pipe at the other side of the coupling and extending to the outer end of the arm and thence to the lever means to pull the lever means responsive to flexing of the pipe in a horizontal plane which varies the reach of the line between the connection to the pipe and the outer end of the arm.

* * * * *